US012351688B2

(12) United States Patent
Chang et al.

(10) Patent No.: US 12,351,688 B2
(45) Date of Patent: Jul. 8, 2025

(54) HYDROPHILIZED POLYDIORGANOSILOXANE VINYLIC CROSSLINKERS

(71) Applicant: Alcon Inc., Fribourg (CH)

(72) Inventors: Frank Chang, Cumming, GA (US); Troy Vernon Holland, Suwanee, GA (US); Houliang Tang, Alpharetta, GA (US); Adam K. Sniady, Lilburn, GA (US)

(73) Assignee: Alcon Inc., Fribourg (CH)

( * ) Notice: Subject to any disclaimer, the term of this patent is extended or adjusted under 35 U.S.C. 154(b) by 823 days.

(21) Appl. No.: 17/666,601

(22) Filed: Feb. 8, 2022

(65) Prior Publication Data

US 2022/0251302 A1 Aug. 11, 2022

Related U.S. Application Data

(60) Provisional application No. 63/147,624, filed on Feb. 9, 2021.

(51) Int. Cl.
*C08G 77/04* (2006.01)
*G02C 7/04* (2006.01)

(52) U.S. Cl.
CPC ............... *C08G 77/04* (2013.01); *G02C 7/04* (2013.01)

(58) Field of Classification Search
CPC combination set(s) only.
See application file for complete search history.

(56) References Cited

U.S. PATENT DOCUMENTS

| | | |
|---|---|---|
| 3,408,429 A | 10/1968 | Wichterle |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert |
| 4,444,711 A | 4/1984 | Schad |
| 4,460,534 A | 7/1984 | Boehm et al. |
| 4,486,577 A | 12/1984 | Mueller |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Nobuyuki et al. |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,070,215 A | 12/1991 | Bambury et al. |
| 5,079,319 A | 1/1992 | Mueller |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,449,729 A | 9/1995 | Lai |
| 5,451,617 A | 9/1995 | Lai |
| 5,486,579 A | 1/1996 | Lai |
| 5,508,317 A | 4/1996 | Müller |
| 5,512,205 A | 4/1996 | Lai |

(Continued)

FOREIGN PATENT DOCUMENTS

| | | |
|---|---|---|
| EP | 0632329 A1 | 1/1995 |
| EP | 3778713 A1 | 2/2021 |

(Continued)

OTHER PUBLICATIONS

Goda, T.; Ishihara, K., "Soft contact lens biomaterials from bioinspired phospholipid polymers", Expert Review of Medical Devices, 2006, 3(2), pp. 167-174.
Huth W. Stanley, Wagner G. Hali: "Identification and Removal of Deposits on Polydimethylsiloxane Silicone Elastomer Lenses", Int Contact Lens Clin, 1981, pp. 19-26.
Kazuhiko Ishihara et al., "Preparation of Phospholipid Polymers and Their Properties as Polymer Hydrogel Membranes", Polymer Journal, 1990, vol. 22, No. 5, pp. 355-360.
Umeda, et al.; "Polymeric phospholipid analogues, 14. The convenient preparation of a vinyl monomer containing a phospholipid analogue"; Macromolecular Rapid Communications; Jul. 1982; vol. 3, Issue 7, pp. 457-459.

*Primary Examiner* — Peter A Salamon
(74) *Attorney, Agent, or Firm* — Jian Zhou

(57) ABSTRACT

The invention provides a class of hydrophilized polydiorganosiloxane vinylic crosslinkers. Each of the hydrophilized polydiorganosiloxane vinylic crosslinkers of the invention comprise (1) a polydiorganosiloxane segment comprising dimethylsiloxane units and hydrophilized siloxane units each having one methyl substituent and one organic substituent having a phosphorylcholine moiety; (2) ethylenically-unsaturated groups. The invention also provides a silicone hydrogel contact lens, which comprises a crosslinked polymeric material comprising repeating units of at least one of such a class of hydrophilized polydiorganosiloxane vinylic crosslinkers. The invention further provides a method of producing a hydrophilized contact lens from a polymerizable composition comprising at least one of such a class of hydrophilized polydiorganosiloxane vinylic crosslinkers.

23 Claims, No Drawings

(56) References Cited

U.S. PATENT DOCUMENTS

| | | | |
|---|---|---|---|
| 5,583,163 | A | 12/1996 | Muller |
| 5,760,100 | A | 6/1998 | Nicolson et al. |
| 5,789,464 | A | 8/1998 | Müller |
| 5,843,346 | A | 12/1998 | Morrill |
| 5,849,810 | A | 12/1998 | Müller |
| 5,894,002 | A | 4/1999 | Boneberger |
| 5,962,548 | A | 10/1999 | Vanderlaan |
| 5,981,675 | A | 11/1999 | Valiant, Jr. |
| 5,994,488 | A | 11/1999 | Yokota |
| 6,039,913 | A | 3/2000 | Hirt |
| 6,166,236 | A | 12/2000 | Bambury |
| 6,762,264 | B2 | 7/2004 | Kunzler |
| 6,858,218 | B2 | 2/2005 | Lai |
| 6,867,245 | B2 | 3/2005 | Iwata |
| 7,214,809 | B2 | 5/2007 | Zanini |
| 7,423,074 | B2 | 9/2008 | Lai |
| 7,605,190 | B2 | 10/2009 | Moszner et al. |
| 7,671,156 | B2 | 3/2010 | Phelan |
| 7,744,785 | B2 | 6/2010 | Phelan |
| 8,129,442 | B2 | 3/2012 | Ueyama |
| 8,163,206 | B2 | 4/2012 | Chang |
| 8,415,405 | B2 | 4/2013 | Maggio |
| 8,475,529 | B2 | 7/2013 | Clarke |
| 8,501,833 | B2 | 8/2013 | Phelan |
| 8,513,325 | B2 | 8/2013 | Liu |
| 8,524,850 | B2 | 9/2013 | Ueyama |
| 8,529,057 | B2 | 9/2013 | Qiu |
| 8,614,261 | B2 | 12/2013 | Iwata |
| 8,658,748 | B2 | 2/2014 | Liu et al. |
| 8,835,525 | B2 | 9/2014 | Kuyu |
| 8,993,651 | B2 | 3/2015 | Chang |
| 9,097,840 | B2 | 8/2015 | Chang et al. |
| 9,103,965 | B2 | 8/2015 | Chang |
| 9,187,601 | B2 | 11/2015 | Huang |
| 9,217,813 | B2 | 12/2015 | Liu |
| 9,475,827 | B2 | 10/2016 | Chang et al. |
| 10,081,697 | B2 | 9/2018 | Huang et al. |
| 10,301,451 | B2 | 5/2019 | Jing et al. |
| 10,449,740 | B2 | 10/2019 | Qian et al. |
| 10,465,047 | B2 | 11/2019 | Jing et al. |
| 10,866,344 | B2 | 12/2020 | Wu et al. |
| 10,875,967 | B2 | 12/2020 | Zhang et al. |
| 2009/0182067 | A1 | 7/2009 | Liu |
| 2013/0059926 | A1 | 3/2013 | Driver et al. |
| 2013/0172574 | A1* | 7/2013 | Ting ............... G02B 1/043 548/406 |
| 2014/0364624 | A1 | 12/2014 | Ting et al. |
| 2018/0043024 | A1 | 2/2018 | Sakurai et al. |
| 2021/0189044 | A1 | 6/2021 | Matsuoka et al. |
| 2022/0227911 | A1 | 7/2022 | Takashima |

FOREIGN PATENT DOCUMENTS

| | | |
|---|---|---|
| JP | 2012530052 A | 11/2012 |
| JP | 2013139567 A | 7/2013 |
| JP | 2014533314 A | 12/2014 |
| JP | 2017146334 | 8/2017 |
| JP | 2017151437 A | 8/2017 |
| JP | 2017197614 A | 11/2017 |
| WO | 2010147779 A2 | 12/2010 |
| WO | 2013070306 A1 | 5/2013 |
| WO | 2016140242 A1 | 9/2016 |
| WO | 2019194264 A1 | 10/2019 |
| WO | 2020218220 A1 | 10/2020 |

\* cited by examiner

HYDROPHILIZED POLYDIORGANOSILOXANE VINYLIC CROSSLINKERS

This application claims the benefits under 35 USC § 119 (e) of U.S. provisional application No. 63/147,624, filed on 9 Feb. 2021, incorporated by references in its entirety.

The present invention relates to hydrophilized polydiorganosiloxane vinylic crosslinkers each having one or more hydrophilized siloxane units having one methyl substituent and one organic substituent having one phosphorylcholine moiety and their uses in making silicone hydrogel contact lenses.

BACKGROUND OF THE INVENTION

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissues. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

One of lens forming materials widely used in making silicone hydrogel contact lenses is a polydiorganosiloxane (e.g., polydimethylsiloxane) vinylic crosslinker which can provide high oxygen permeability to resultant contact lenses. But, a polydimethylsiloxane vinylic crosslinker can affect the mechanical properties, e.g., elastic modulus, of the resultant contact lenses. For example, a low molecular weight polydimethylsiloxane vinylic crosslinker (<2,000 g/mol) may provide a resultant contact lens with a relatively high elastic modulus in order to achieve a desired oxygen permeability. A relative high molecular weight polydimethylsiloxane vinylic crosslinker is typically used in achieve both the high oxygen permeability and the low elastic modulus. However, because of its hydrophobic nature, a polydimethylsiloxane vinylic crosslinker, especially one with high molecular weight, is not compatible with hydrophilic components in a lens formulation, including, e.g., N,N-dimethylacrylamide (DMA), N-vinylpyrrolidone (NVP), N-vinyl-N-methylacetamide (VMA), or an internal wetting agent. It would be difficult to obtain homogeneous lens formulations (i.e., clear lens formulations) from use of such a polydimethylsiloxane vinylic crosslinker.

Incorporation of silicone in a contact lens material also has undesirable effects on the biocompatibility of the contact lens, because silicone is hydrophobic and has great tendency to migrate onto the lens surface being exposed to air. As a result, a silicone hydrogel contact lens will generally require a surface modification process to eliminate or minimize the exposure of silicone of the contact lens and to maintain a biocompatible surface.

Therefore, there is a need for new hydophilized polydiorganosiloxane vinylic crosslinkers suitable for produce silicone hydrogel contact lenses.

Documents, including U.S. Pat. Nos. 4,260,725, 5,034,461, 5,346,946, 5,416,132, 5,449,729, 5,486,579, 5,512,205, 5,760,100, 5,994,488, 6,858,218, 6,867,245, 7,671,156, 7,744,785, 8,129,442, 8,163,206, 8,501,833, 8,513,325, 8,524,850, 8,835,525, 8,993,651, 9,187,601, 10,081,697, 10,449,740, 10,866,344 and 10,875,967 disclose that various lens formulations (which are either solvent-containing or solventless formulations) comprising one or more hydrophilized polysiloxane crosslinkers can be used for making silicone hydrogel contact lenses.

SUMMARY OF THE INVENTION

The present invention, in one aspect, provides a polysiloxane vinylic crosslinker. The polydiorganosiloxane vinylic crosslinker of the invention comprises a polydiorganosiloxane segment comprising dimethylsiloxane units and hydrophilized siloxane unit having one methyl substituent and one organic substituent having a phosphorylcholine moiety and ethylenically-unsaturated groups.

In another aspect, the invention provides a soft contact lens comprising a crosslinked polymeric material comprising units of a polydiorganosiloxane vinylic crosslinker of the invention (described above).

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF PREFERRED EMBODIMENTS

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case.

A "silicone hydrogel contact lens" refers to a contact lens comprising a silicone hydrogel material as bulk material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" refers to a silicone-containing hydrogel comprising repeating units of at least one silicone-containing monomer and/or silicone-containing vinylic crosslinker and repeating units of at least hydrophilic vinylic monomer. It is typically formed by copolymerization of a polymerizable composition comprising at least one silicone-containing monomer and/or silicone-containing vinylic crosslinker and at least one hydrophilic vinylic monomer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.5% by weight at room temperature (i.e., a temperature of about 21° C. to about 27° C.).

The term "insoluble", in reference to a compound or material in a solvent, means that the compound or material can be dissolved in the solvent to give a solution with a concentration of less than 0.01% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

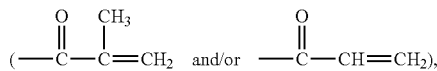

allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

An "acrylic monomer" refers to a vinylic monomer having one sole (meth)acryloyl group. Examples of acrylic monomrs includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

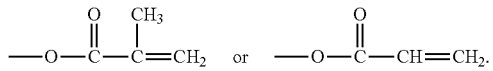

An "(meth)acrylamido monomer" refers to a vinylic monomer having one sole group of

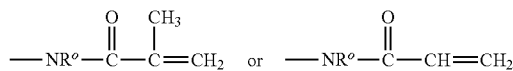

in which $R^0$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

The term "ene group" refers to a monovalent radical of CH$_2$=CH— or CH$_2$=CCH$_3$— that is not covalently attached to an oxygen or nitrogen atom or a carbonyl group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A siloxane, which often also described as a silicone, refers to a molecule having at least one moiety of —Si—O—Si— where each Si atom carries two organic groups as substituents.

A "silicone-containing vinylic monomer or crosslinker" or a "siloxane-containing vinylic monomer or crosslinker" interchageably refers to a vinylic monomer or crosslinker having at least one moiety of —Si—O—Si— where each Si atom carries at least two substituents (organic groups).

A "polysiloxane segment" or "polydiorganosiloxane segment" interchangeably refers to a polymer chain segment (i.e., a divalent radical) of

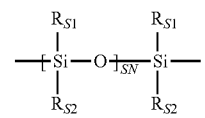

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-(OC$_2$H$_4$)$_{\gamma 1}$—OR$^0$ (in which alk is $C_1$-$C_6$ alkylene diradical, $R^0$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—NR$_{N1}$R$_{N1}$'), amino linkages of —NR$_{N1}$—, amide linkages of —CONR$_{N1}$—, amide of —CONR$_{N1}$R$_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and an organic radical having a phosphorylcholine moiety.

A "polydiorganosiloxane vinylic crosslinker" or polysiloxane vinylic crosslinker" interchangeably refers to a compound comprising at least one polysiloxane segment and at least two ethylenically-unsaturated groups.

As used in this application, the term "phosphorylcholine moiety" refers to a zwitterionic moiety of

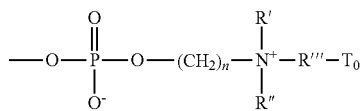

in which n is an integer of 1 to 5 and R' and R" independently of each other are $C_1$-$C_8$ alkyl or $C_1$-$C_8$ hydroxyalkyl, R'''' is a $C_1$-$C_8$ alkylene divalent radical, and $T_o$ is hydrogen, a hydroxyl group, a $C_1$-$C_4$ alkoxy, or a covalent bond.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

The term "terminal ethylenically-unsaturated group" refers to one ethylenically-unsaturated group at one of the two ends of the main chain (or backbone) of an organic compound as known to a person skilled in the art.

A "blending vinylic monomer" refers to a vinylic monomer capable of dissolving both hydrophilic and hydrophobic components of a polymerizable composition to form a solution.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

"Post-curing surface treatment", in reference to a silicone hydrogel bulk material or a SiHy contact lens, means a surface treatment process that is performed after the silicone hydrogel bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a silicone hydrogel (SiHy) contact lens or a SiHy lens bulk material as well known to a person skilled in the art.

In general, the invention is directed to a class of hydrophilized polydiorganosiloxane vinylic crosslinkers which each comprise (1) a polydiorganosiloxane segment comprising dimethylsiloxane units and hydrophilized siloxane unit having one methyl substituent and one organic substituent having a phosphorylcholine moiety; (2) ethylenically-unsaturated groups.

There are some potential unique features associated with use of hydrophilized polydiorganosiloxane vinylic crosslinkers of the invention in making silicone hydrogel contact lenses.

First, a hydrophilized polydiorganosiloxane vinylic crosslinker of the invention is more compatible with other polymerizable components in a typical polymerizable composition (i.e., a lens formulation) for making contact lenses, because a hydrophilic ionic phosphorylcholine moiety is incorporated as one of the two substituents of each hydrophilized siloxane unit in a polydiorganosiloxane vinylic crosslinker. It is suitable for preparing various solvent-containing or solventless lens formulations.

Second, because a hdyrophilized polydiorganosiloxane vinylic crosslinker of the invention still comprises dimethylsiloxane units, it can provide a relatively high oxygen permeability to resultant contact lenses, like other polydimethylsiloxane vinylic crosslinkers currently used in making silicone hydrogel contact lenses. It is believed that in order to achieve a higher oxygen permeabily, a polydiorganosiloxane should have at least 5 dimethylsiloxane units in a consecutive sequence. By controlling ratio of hydrophilized siloxane units over dimethylsiloxane units in a hydrophilized polydiorganosiloxane vinylic crosslinker of the invention to be sufficient low, one can ensure that a resultant polydiorganosiloxane vinylic crosslinker can have sufficient siloxane segments consisting of more than 5 consecutive dimethylsiloxane units. Such a polydiorganosiloxane vinylic crosslinker may be used to efficiently provide relatively-high oxygen permeability per siloxane unit without adversely affecting its compatibility with other polymerizable components.

Third, a hydrophilized polydiorganosiloxane vinylic crosslinker of the invention can be used to produce silicone hydrogel contact lenses with improved surface properties. Because phosphorylcholine moieties are parts of a polydiorganosiloxane segment, they will migrate to the surface of a resultant silicone hydrogel contact lens made from a lens formulation comprising a hydrophilized polydiorganosiloxane vinylic crosslinker of the invention, as silicones migrate to the lens surface. As a result, the resultant silicone hydrogel contact lenses can have phosphorylcholine moieties enriched in the lens surfaces.

Phosphorylcholine is commonly used in medical devices to improve biocompatibility, reduce protein adsorption, and reduce inflammatory response. The surfaces containing phospholipids have been shown to possess antifouling properties (see, Goda, T.; Ishihara, K.; Expert Review of Medical Devices 2006, 3(2), 167-174). In contact lenses, phosphorylcholine also helps to maintain hydration while preventing deposition of lipids and proteins. Because of these observations, monomers or polymers containing the phosphorylcholine group have been added into contact lens formulations (see, e.g., Liu, Y. Polymerizable contact lens formulations and contact lenses obtained therefrom. U.S. Patent 2009/0182067 A1, Jul. 16, 2009), lubricating eye drops (see, e.g., Sakurai, S.; Miyamoto, K.; Shimamura, Y.; Takahashi, M.; Matsuoka, Y.; Yamamoto, N. Eye drops. WO/2016/140242, Sep. 9, 2016), contact lens surfaces (see, e.g., Takahashi, M.; Sato, K.; Sakurai, T.; Nakajima, M.; Matsuoka, Yamamoto, N. Contact lens having phosphorylcholine group-containing hydrophilic polymer on surface thereof. JP2017146334, Aug. 24, 2017), and packaging saline (Sakurai, T.; Sato, K.; Takahashi, M.; Nakajima, M.; Matsuoka, Y.; Shimamura, Y.; Miyamoto, K.; Yamamoto, N. Solutions for soft contact lenses. JP2017151437, Aug. 31, 2017) in order to improve contact lens on-eye performance.

Consequently, the resultant silicone hydrogel contact lenses can be more biocompatible and resistant to lipid deposition.

The present invention, in one aspect, provides a hydrophilized polydiorganosiloxane vinylic crosslinker. The hdyrophilized polydiorganosiloxane vinylic crosslinker of the invention comprises: (1) a polydiorganosiloxane segment comprising dimethylsiloxane units and at least one hydrophilized siloxane unit having one methyl substituent and one organic substituent having a phosphorylcholine moiety, and (2) ethylenically-unsaturated groups (preferably (meth)acryloyl groups).

In a preferred embodiment, the polydiorganosiloxane segment comprises from 6 to 500 (preferably from 10 to 450, more preferably from 15 to 400, even more preferably from 20 to 350) dimethylsiloxane units and from 3 to 80 (preferably from 5 to 70, more preferably from 7 to 60, even more preferably from 9 to 50) hydrophilized siloxane units.

In a preferred embodiment, the molar ratio of the hydrophilized siloxane units to the dimethylsiloxane units is from about 0.002 to about 0.50 (preferably from about 0.002 to about 0.20, more preferably from about 0.004 to about 0.1, even more preferably from about 0.004 to about 0.05).

In another preferred embodiment, a hydrophilized polydiorganosiloxane vinylic crosslinker of the invention can have a number average molecular weight of at least 1000 Daltons (preferably from 1500 Daltons to 80000 Daltons, more preferably from 2000 to 50000 Daltons, even more preferably from 2500 to 25000 Dalton).

In accordance with the invention, the hydrophilized polydiorganosiloxane vinylic crosslinker is preferably defined by formula (1) or (2)

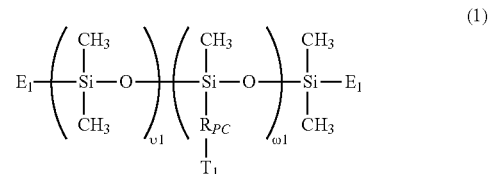

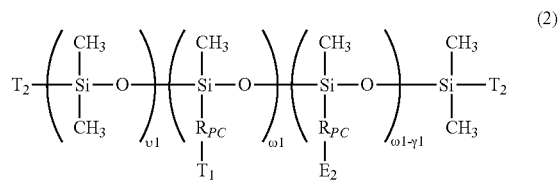

in which:
- υ1 is an integer of from 6 to 500 (preferably from 10 to 450, more preferably from 15 to 400, even more preferably from 20 to 350);
- ω1 is an integer of from 3 to 80 (preferably from 5 to 70, more preferably from 7 to 60, even more preferably from 9 to 50);
- γ1 is an integer of from 1 to 78 (preferably from 3 to 68, more preferably from 5 to 58, even more preferably from 7 to 48);

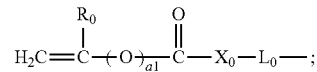

$E_1$ is a monovalent radical of
$E_2$ is a monovalent radical of

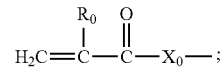

$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

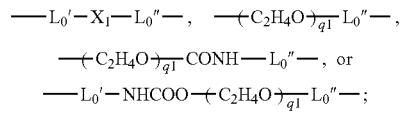

$L_0'$ is a $C_2$-$C_8$ alkylene divalent radical;
$L_0''$ is $C_3$-$C_8$ alkylene divalent radical;
$X_1$ is —O—, —$NR_{N1}$—, —NHCOO—, —OCONH—, —$CONR_{N1}$—, or —$NR_{N1}CO$—;
q1 is an integer of 1 to 20;

$R_{PC}$ is a monovalent radical of

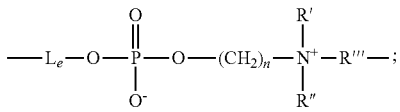

$L_e$ is a divalent radical of

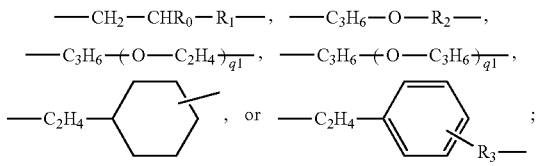

$R_1$ is a linear or branched $C_1$-$C_{10}$ alkylene divalent radical;

R2 is a linear or branched $C_3$-$C_{10}$ alkylene divalent radical;

R3 is a direct bond or a linear or branched $C_1$-$C_4$ alkylene divalent radical;

n is an integer of 1 to 5;

R' and R" independently of each other are $C_1$-$C_8$ alkyl or $C_1$-$C_8$ hydroxyalkyl;

R'" is a $C_1$-$C_8$ alkylene divalent radical;

$T_1$ is hydrogen, a hydroxyl group or a $C_1$-$C_4$ alkoxy; and $T_2$ is a $C_1$-$C_8$ alkyl, a $C_1$-$C_8$ hydroxyalkyl, $R_4$—O—$R_5$—, or —$R_{PC}$—$T_1$;

$R_4$ is a $C_1$-$C_4$ alkyl; and $R_5$ is a $C_2$-$C_8$ alkylene divalent radical.

In a preferred embodiment, in formula (1) al is zero and then $E_1$ is a monovalent radical of

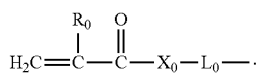

In another preferred embodiment, $\omega1/\upsilon1$ is from about 0.002 to about 0.50 (preferably from about 0.002 to about 0.20, more preferably from about about 0.004 to about 0.1, even more preferably from about 0.004 to about 0.05).

A hydrophilized polydiorganosiloxane vinylic crosslinker of formula (1) can be prepared in a three-step process.

In the first step, a hydrosiloxane-containing polydiorganosiloxane of formula (3) is reacted with an ene monomer containing a hydroxy group in a platinum-catalyzed hydrosilylation reaction as known to a person skilled in the art, to form a polydiorganosiloxane vinylic crosslinker having pendant reactive functional groups as represented by formula (4)

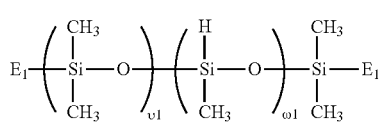

(3)

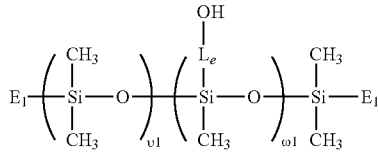

(4)

in which $E_1$, $\upsilon1$, $\omega1$, and $L_e$ are as defined above for formula (1).

Hydrosiloxane-containing polydiorganosiloxane of formula (3) can be prepared according to any methods known to a person skilled in the art.

As an illustrative example, a hydrosiloxane-containing polydiorganosiloxane of formula (3) can be prepared from polymerization of a mixture of octamethylcyclotetrasiloxane (D4) and 1,3,5,7-tetramethylcyclotetrasiloxane (H4) in presence of 1,3-bis(E1 group)-terminated tetramethyldisiloxane (e.g., 1,3-bis[3-(meth)acryloxypropyl] tetramethyldisiloxane, 1,3-bis[3-(meth)acrylamidopropyl] tetramethyldisiloxane, or the like) as a chain end block and in the presence of a catalyst. By controlling the molar ratio of D4 to H4, a desired value of $\upsilon1/\omega1$ can be obtained. It is understood that 1,3-bis(E1 group)-terminated tetramethyldisiloxane can be prepared from 1,3-bis(hydroxyalkyl)tetramethyldisloxane (e.g., 1,3-bis(hydroxypropyl)tetramethyldisloxane) or 1,3-bis(aminoalkyl)tetramethyldisloxane (e.g., 1,3-bis(aminopropyl)tetramethyldisloxane).

Any ene monomers can be used in preparing a polydiorganosiloxane vinylic crosslinker of formula (4), so long as the ene monomers comprise one sole hydroxyl group. Various ene monomers having one sole hydroxyl group can be obtained from commercial suppliers or prepared according to known methods.

Examples of commercially available hydroxyl-containing ene monomers include without limitation allyl alcohol, 2-methyl-2-propen-1-ol, 3-buten-1-ol, 3-buten-2-ol, 3-methyl-3-buten-1-ol, 2-methyl-3-buten-2-ol, 2-methyl-3-buten-1-ol, 1-penten-3-ol, 4-penten-1-ol, 4-penten-2-ol, 1-hexen-3-ol, 5-hexen-1-ol, 5-hexen-2-ol, 3-methyl-1-hexen-3-ol, 5-methyl-1-hexen-3-ol, 1-hepten-3-ol, allyloxyethanol, di(ethylene glycol) monoallyl ether, poly(ethylene glycol) monoallyl ether, poly(propylen glycol) monoallyl ether, allyloxypropanol, 1-allyloxy-2-propanol, 4-allyloxy-1-butanol, 1-vinyl cyclohexanol, 2-vinyl cyclohexanol, 4-vinylcyclohexanol, 1-allylcyclohexanol, 2-al lycyclohexanol, 4-allylcyclohexanol, 4-vinylphenol, (4-vinyl phenyl)methanol, (4-vinylphenyl)ethanol, 3-(4-Vinylphenyl)-1-propanol, 1-(4-Vinylphenyl)-2-methyl-2-propanol, etc.

In the second step, a polydiorganosiloxane vinylic crosslinker of formula (4) is reacted with ethylenephosphorochloride (i.e., 2-chloro-2-oxo-1,3,2-dioxaphospholane) in the presence of a base (e.g., triethylamine) to attach ethylene phosphate groups

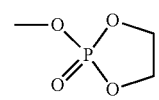

(i.e., 2-oxo-1,3,2-dioxaphosphoroyloxy group(s)) onto each of the pendant groups $L_e$ of the polydiorganosiloxane vinylic crosslinker of formula (4).

Alternatively, a polydiorganosiloxane vinylic crosslinker of formula (4) can be reacted with a bromoalkylphosphorylchloridate (which can be obtained by reacting phosphorus oxychloride with a bromoalcohol, HO—(CH2)$_n$Br), in the presence of a base (e.g., triethylamine), followed by acid hydrolysis to attach one or more bromoalkylphosphate groups

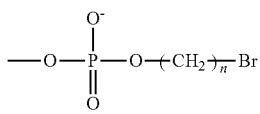

onto each of the pendant groups $L_e$ of the polydiorganosiloxane vinylic crosslinker of formula (4).

In the third step, the resultant polydiorganosiloxane vinylic crosslinker comprising pendant ethylene phosphate groups or bromoalkylphosphate groups can be in turn treated with a tertiary amine, $NR_1'R_2'R_3'$, to be converted into phosphorylcholine groups, i.e., forming a hydrophilized polydiorganosiloxane vinylic crosslinker of formula (1).

Similarly, a hydrophilized polydiorganosiloxane vinylic crosslinker of formula (2) can be prepared in a three-step process.

In the first step, a hydrosiloxane-containing polydiorganosiloxane of formula (5) is reacted with an ene monomer containing a hydroxy group in a platinum-catalyzed hydrosilylation reaction as known to a person skilled in the art, to form a polydiorganosiloxane vinylic crosslinker having pendant reactive functional groups as represented by formula (5)

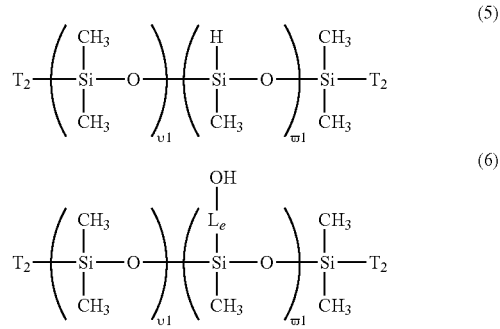

in which $E_1$, $\upsilon 1$, $\omega 1$, and $L_e$ are as defined above for formula (2).

Hydrosiloxane-containing polydiorganosiloxane of formula (5) can be prepared according to any methods known to a person skilled in the art.

As an illustrative example, a hydrosiloxane-containing polydiorganosiloxane of formula (5) can be prepared from polymerization of a mixture of octamethylcyclotetrasiloxane (D4) and 1,3,5,7-tetramethylcyclotetrasiloxane (H4) in presence of 1,3-bis($T_2$ group)-terminated tetramethyldisiloxane (e.g., 1,3-bis(3-hydroxyethoxypropyl) tetramethyldisiloxane, or the like) as a chain end block and in the presence of a catalyst. By controlling the molar ratio of D4 to H4, a desired value of $\upsilon 1/\omega 1$ can be obtained.

In the second step, a polydiorganosiloxane vinylic crosslinker of formula (6) is reacted with ethylenephosphorochloride (i.e., 2-chloro-2-oxo-1,3,2-dioxaphospholane) in the presence of a base (e.g., triethylamine) to attach ethylene phosphate groups

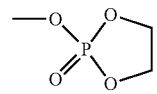

(i.e., 2-oxo-1,3,2-dioxaphsphoroyloxy group(s)) onto each of the pendant groups $L_e$ of the polydiorganosiloxane vinylic crosslinker of formula (6).

Alternatively, a polydiorganosiloxane vinylic crosslinker of formula (6) can be reacted with a bromoalkylphosphorylchloridate (which can be obtained by reacting phosphorus oxychloride with a bromoalcohol, HO—(CH2)$_n$Br), in the presence of a base (e.g., triethylamine), followed by acid hydrolysis to attach one or more bromoalkylphophate groups

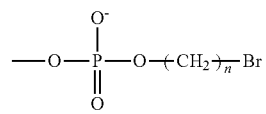

onto each of the pendant groups $L_e$ of the polydiorganosiloxane vinylic crosslinker of formula (6).

In the third step, the resultant polydiorganosiloxane vinylic crosslinker comprising pendant ethylene phosphate groups or bromoalkylphosphate groups can be in turn treated with a tertiary amine, $NR_1'R_2'R_3'$, to be converted into phosphorylcholine groups, i.e., forming a hydrophilized polydiorganosiloxane vinylic crosslinker of formula (2).

A hydrophilized polydiorganosiloxane vinylic crosslinker of the invention (formula (1) or (2) as defined above) can find particular use in preparing a polymer, preferably a silicone hydrogel polymeric material, which is another aspect of the invention. A person skilled in the art knows how to prepare a polymer or a silicone hydrogel polymeric material from a polymerizable composition according to any known polymerization mechanism.

In another aspect, the invention provides a silicone hydrogel contact lens comprising a crosslinked polymeric material comprising: repeating units of a hydrophilized polydiorganosiloxane vinylic crosslinker of the invention (as described above).

In a preferred embodiment, a silicone hydrogel contact lens of the invention, when being fully hydrated, has an oxygen permeability (Dk) of at least about 40 barrers (preferably at least about 60 barrers, more preferably at least about 70 barrers, even more preferably at least about 80 barrers), a water content of from about 15% to about 70% by weight (preferably from about 20% to about 70% by weight, more preferably from about 25% to about 65% by weight, even more preferably from about 30% to about 60% by weight), an elastic modulus of from about 0.20 MPa to about 1.8 MPa (preferably from about 0.25 MPa to about 1.5 MPa, more preferably from about 0.3 MPa to about 1.2 MPa, even more preferably from about 0.4 MPa to about 1.0 MPa).

A person skilled in the art knows well how to measure the oxygen permeability, oxygen transmissibility, water content, and elastic modulus of silicone hydrogel contact lenses. These lens properties have been reported by all manufacturers for their silicone hydrogel contact lens products.

A silicone hydrogel contact lens of the invention also comprises units of at least one silicone-containing polymerizable component and units of at least one hydrophilic vinylic monomer.

In accordance with the invention, the silicone-containing polymerizable component other than a hydrophilized polydiorganosiloxane vinylic crosslinker of the invention can be a silicone-containing vinylic monomer, a polysiloxane vinylic crosslinker, or combinations thereof.

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 54,51,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (I), are described later in this application and can be prepared according to the procedures disclosed in U.S. Pat. No. 10,081,697.

Another class of preferred polysiloxane vinylic crosslinkers are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers(as described later in this application), N-2-hydroxyethyl vinyl carbamate, N-carboxyvinyl-β-alanine (VINAL), N-carboxyvinyl-α-alanine, and combinations thereof.

A silicone hydrogel contact lens of the invention can also further comprise units of at least one hydrophobic vinylic monomer, at least one non-silicone vinylic crosslinker, or combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

In accordance with the invention, a silicone hydrogel (SiHy) contact lens of the invention can be produced according to any lens manufacturing processes. A person skilled in the art knows very well how to make SiHy contact lenses. For example, SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., a SiHy lens formulation) typically is dispensed into molds and cured (i.e., polymerized and/or crosslinked) in molds for making SiHy contact lenses.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, the polymerizable composition can be introduced (dispensed) into a cavity formed by a mold according to any known methods.

After the polymerizable composition is dispensed into the mold, it is polymerized to produce a SiHy contact lens. Crosslinking may be initiated thermally or actinically, preferably by exposing the polymerizable composition in the mold to a spatial limitation of actinic radiation to crosslink the polymerizable components in the polymerizable composition.

Opening of the mold so that the molded SiHy contact lens can be removed from the mold may take place in a manner known per se.

The molded SiHy contact lenses can be subject to lens extraction with a liquid extraction medium to remove unpolymerized polymerizable components and formed oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

After extraction, silicone hydrogel contact lens can be hydrated in water or an aqueous solution to replace the liquid extraction medium, according to any method known to a person skilled in the art.

The hydrated silicone hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

A SiHy contact lens formulation can also comprise other necessary components known to a person skilled in the art, such as, for example, free-radical initiators (e.g., thermal polymerization initiators, photoinitiators), a UV-absorbing vinylic monomer, a high-energy-violet-light ("HEVL") absorbing vinylic monomer, a visibility tinting agent (e.g., reactive dyes, polymerizable dyes, pigments, antimicrobial agents (e.g., preferably silver nanoparticles), a bioactive agent, leachable polymeric wetting agents (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4- pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis [2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329. Preferably, a SiHy lens formulation for making a SiHy contact lenses comprises at least one photoinitiator which can be initiated by visible lights, such as, benzoylphosphine oxide photoinitiators, Germanium-based Norrish Type I photoinitiators, or combinations thereof.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A hydrophilized polydiorganosiloxane vinylic crosslinker, comprising:
   (1) a polydiorganosiloxane segment comprising dimethylsiloxane units and at least one hydrophilized siloxane unit having one methyl substituent and one organic substituent having one phosphorylcholine moiety; and
   (2) ethylenically-unsaturated groups.
2. The hydrophilized polydiorganosiloxane vinylic crosslinker of embodiment 1, wherein the polydiorganosiloxane segment comprises from 6 to 500 dimethylsiloxane units.
3. The hydrophilized polydiorganosiloxane vinylic crosslinker of embodiment 1, wherein the polydiorganosiloxane segment comprises from 10 to 450 dimethylsiloxane units.

4. The hydrophilized polydiorganosiloxane vinylic crosslinker of embodiment 1, wherein the polydiorganosiloxane segment comprises from 15 to 400 dimethylsiloxane units.
5. The hydrophilized polydiorganosiloxane vinylic crosslinker of embodiment 1, wherein the polydiorganosiloxane segment comprises from 20 to 350 dimethylsiloxane units.
6. The hydrophilized polydiorganosiloxane vinylic crosslinker of any one of embodiments 1 to 5, wherein the polydiorganosiloxane segment comprises from 3 to 80 hydrophilized siloxane units.
7. The hydrophilized polydiorganosiloxane vinylic crosslinker of any one of embodiments 1 to 5, wherein the polydiorganosiloxane segment comprises from 5 to 70 hydrophilized siloxane units.
8. The hydrophilized polydiorganosiloxane vinylic crosslinker of any one of embodiments 1 to 5, wherein the polydiorganosiloxane segment comprises from 7 to 60 hydrophilized siloxane units.
9. The hydrophilized polydiorganosiloxane vinylic crosslinker of any one of embodiments 1 to 5, wherein the polydiorganosiloxane segment comprises from 9 to 50 hydrophilized siloxane units.
10. The hydrophilized polydiorganosiloxane vinylic crosslinker of any one of embodiments 1 to 9, wherein the ethylenically unsaturated groups are (meth)acryloyl groups.
11. The hydrophilized polydiorganosiloxane vinylic crosslinker of any one of embodiments 1 to 10, wherein the molar ratio of the hydrophilized siloxane units to the dimethylsiloxane units is from about 0.002 to about 0.50.
12. The hydrophilized polydiorganosiloxane vinylic crosslinker of any one of embodiments 1 to 10, wherein the molar ratio of the hydrophilized siloxane units to the dimethylsiloxane units is from about 0.002 to about 0.20.
13. The hydrophilized polydiorganosiloxane vinylic crosslinker of any one of embodiments 1 to 10, wherein the molar ratio of the hydrophilized siloxane units to the dimethylsiloxane units is from about 0.004 to about 0.1.
14. The hydrophilized polydiorganosiloxane vinylic crosslinker of any one of embodiments 1 to 10, wherein the molar ratio of the hydrophilized siloxane units to the dimethylsiloxane units is from about 0.004 to about 0.05.
15. The hydrophilized polydiorganosiloxane vinylic crosslinker of any one of embodiments 1 to 14, wherein the hydrophilized polydiorganosiloxane vinylic crosslinker has a number average molecular weight of at least 1000 Daltons.
16. The hydrophilized polydiorganosiloxane vinylic crosslinker of any one of embodiments 1 to 14, wherein the hydrophilized polydiorganosiloxane vinylic crosslinker has a number average molecular weight of from 1500 Daltons to 80000 Daltons.
17. The hydrophilized polydiorganosiloxane vinylic crosslinker of any one of embodiments 1 to 14, wherein the hydrophilized polydiorganosiloxane vinylic crosslinker has a number average molecular weight of from 2000 to 50000 Daltons.
18. The hydrophilized polydiorganosiloxane vinylic crosslinker of any one of embodiments 1 to 14, wherein the hydrophilized polydiorganosiloxane vinylic crosslinker has a number average molecular weight of from 2500 to 25000 Dalton.
19. The hydrophilized polydiorganosiloxane vinylic crosslinker of any one of embodiments 1 to 18, wherein the hydrophilized polydiorganosiloxane vinylic crosslinker is defined by formula (1) or (2)

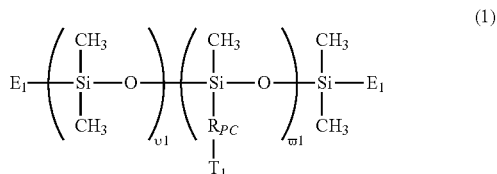

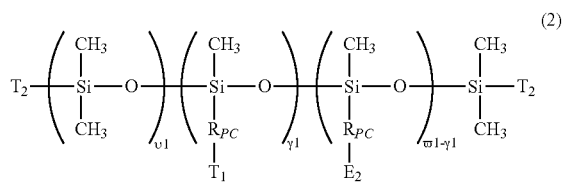

in which:

$\upsilon 1$ is an integer of from 6 to 500;

$\omega 1$ is an integer of from 3 to 80;

$\gamma 1$ is an integer of from 1 to 78;

$E_1$ is a monovalent radical of

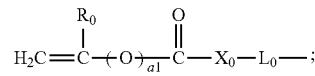

$E_2$ is a monovalent radical of

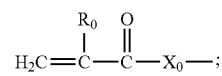

$R_0$ is hydrogen or methyl;

a1 is zero or 1;

$X_0$ is O or $NR_{N1}$;

$R_{N1}$ is hydrogen or a $C_1$-$C_6$ alkyl;

$L_0$ is a $C_2$-$C_8$ alkylene divalent radical or a divalent radical of

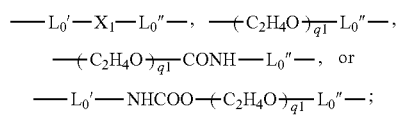

$L_0'$ is a $C_2$-$C_8$ alkylene divalent radical;

$L_0''$ is a $C_3$-$C_8$ alkylene divalent radical;

$X_1$ is —O—, —$NR_{N1}$—, —NHCCO—, —OCONH—, —$CONR_{N1}$—, or —$NR_{N1}CO$—;

q1 is an integer of 1 to 20;

$R_{PC}$ is a monovalent radical of

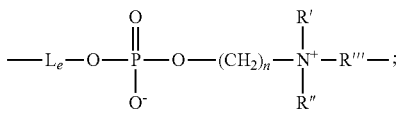

$L_e$ is a divalent radical of

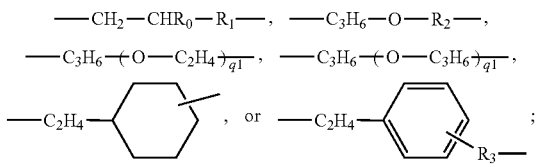

$R_1$ is a linear or branched $C_1$-$C_{10}$ alkylene divalent radical;

$R_2$ is a linear or branched $C_3$-$C_{10}$ alkylene divalent radical;

$R_3$ is a direct bond or a linear or branched $C_1$-$C_4$ alkylene divalent radical;

n is an integer of 1 to 5;

R' and R" independently of each other are $C_1$-$C_8$ alkyl or $C_1$-$C_8$ hydroxyalkyl;

R''' is a $C_1$-$C_8$ alkylene divalent radical;

$T_1$ is hydrogen, a hydroxyl group or a $C_1$-$C_4$ alkoxy; and

T2 is a $C_1$-$C_8$ alkyl, a $C_1$-$C_8$ hydroxyalkyl, $R_4$—O—$R_5$—, or —$R_{PC}$—$T_1$;

R4 is a $C_1$-$C_4$ alkyl; and

R5 is a $C_2$-$C_8$ alkylene divalent radical.

20. The hydrophilized polydiorganosiloxane vinylic crosslinker of embodiment 19, wherein in formula (1) or (2) υ1 is an integer of from 10 to 450.

21. The hydrophilized polydiorganosiloxane vinylic crosslinker of embodiment 19, wherein in formula (1) or (2) υ1 is an integer of from 15 to 400.

22. The hydrophilized polydiorganosiloxane vinylic crosslinker of embodiment 19, wherein in formula (1) or (2) υ1 is an integer of from 20 to 350.

23. The hydrophilized polydiorganosiloxane vinylic crosslinker of any one of embodiments 19 to 22, wherein in formula (1) or (2) ω1 is an integer of from 5 to 70.

24. The hydrophilized polydiorganosiloxane vinylic crosslinker of any one of embodiments 19 to 22, wherein in formula (1) or (2) ω1 is an integer of from 7 to 60.

25. The hydrophilized polydiorganosiloxane vinylic crosslinker of any one of embodiments 19 to 22, wherein in formula (1) or (2) ω1 is an integer of from 9 to 50.

26. The hydrophilized polydiorganosiloxane vinylic crosslinker of any one of embodiments 19 to 25, wherein the hydrophilized polydiorganosiloxane vinylic crosslinker is represented by formula (1).

27. The hydrophilized polydiorganosiloxane vinylic crosslinker of embodiment 26, wherein in formula (1) a1 is zero.

28. The hydrophilized polydiorganosiloxane vinylic crosslinker of embodiment 27, wherein in formula (1) $X_0$ is O.

29. The hydrophilized polydiorganosiloxane vinylic crosslinker of embodiment 27, wherein in formula (1) $X_0$ is $NR_{N1}$.

30. The hydrophilized polydiorganosiloxane vinylic crosslinker of any one of embodiments 19 to 25, wherein the hydrophilized polydiorganosiloxane vinylic crosslinker is represented by formula (2).

31. The hydrophilized polydiorganosiloxane vinylic crosslinker of embodiment 30, wherein in formula (2) $X_0$ is O.

32. The hydrophilized polydiorganosiloxane vinylic crosslinker of embodiment 30, wherein in formula (2) $X_0$ is $NR_{N1}$.

33. A silicone hydrogel contact lens, comprising a cross-linked polymeric material that comprises units of a hydrophilized polydiorganosiloxane vinylic crosslinker of any one of embodiments 1 to 32.

34. The silicone hydrogel contact lens of embodiment 33, wherein the silicone hydrogel contact lens, when being fully hydrated, has an oxygen permeability (Dk) of at least about 40 barrers, a water content of from about 15% to about 70% by weight, and an elastic modulus of from about 0.20 MPa to about 1.8 MPa.

35. The silicone hydrogel contact lens of embodiment 33 or 34, wherein the silicone hydrogel contact lens, when being fully hydrated, has an oxygen permeability (Dk) of at least about 60 barrers.

36. The silicone hydrogel contact lens of embodiment 33 or 34, wherein the silicone hydrogel contact lens, when being fully hydrated, has an oxygen permeability (Dk) of at least about 70 barrers.

37. The silicone hydrogel contact lens of embodiment 33 or 34, wherein the silicone hydrogel contact lens, when being fully hydrated, has an oxygen permeability (Dk) of at least about 80 barrers.

38. The silicone hydrogel contact lens of any one of embodiments 33 to 37, wherein the silicone hydrogel contact lens, when being fully hydrated, has a water content of from about 20% to about 70% by weight.

39. The silicone hydrogel contact lens of any one of embodiments 33 to 38, wherein the silicone hydrogel contact lens, when being fully hydrated, has a water content of from about 25% to about 65% by weight.

40. The silicone hydrogel contact lens of any one of embodiments 33 to 38, wherein the silicone hydrogel contact lens, when being fully hydrated, has a water content of from about 30% to about 60% by weight.

41. The silicone hydrogel contact lens of any one of embodiments 33 to 40, wherein the hydrophilized silicone hydrogel contact lens, when being fully hydrated, has an elastic modulus of from about 0.25 MPa to about 1.5 MPa.

42. The silicone hydrogel contact lens of any one of embodiments 33 to 40, wherein the hydrophilized silicone hydrogel contact lens, when being fully hydrated, has an elastic modulus of from about 0.3 MPa to about 1.2 MPa.

43. The silicone hydrogel contact lens of any one of embodiments 33 to 40, wherein the hydrophilized silicone hydrogel contact lens, when being fully hydrated, has an elastic modulus of from about 0.4 MPa to about 1.0 MPa.

44. The silicone hydrogel contact lens of any one of embodiments 33 to 43, wherein the silicone hydrogel contact lens comprises units of at least one silicone-containing polymerizable component and units of at least one hydrophilic vinylic monomer.

45. The silicone hydrogel contact lens of any one of embodiments 33 to 44, wherein the silicone hydrogel contact material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

46. The silicone hydrogel contact lens of any one of embodiments 33 to 44, wherein the silicone hydrogel contact material comprises repeating units of at least one silicone-containing vinylic monomer of formula (M1) or (M2)

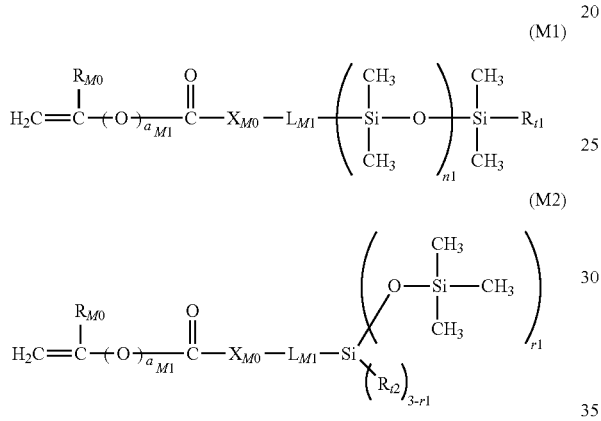

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

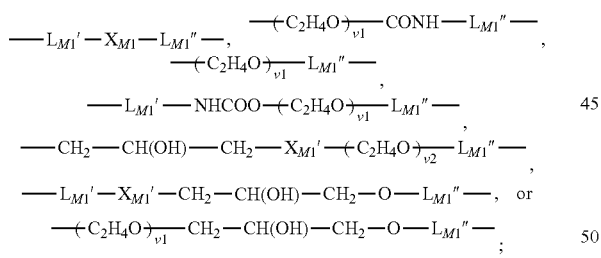

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; v2 is an integer of 0 to 30; n1 is an integer of 3 to 40; and r1 is an integer of 2 or 3.

47. The silicone hydrogel contact lens of embodiment 45 or 46, wherein said at least one silicone-containing vinylic monomer comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth) acryloxy-2-(2-hydroxyethoxy)-propyloxy)propylbis (trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl) propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl](meth)acrylamide, N-[tris(dimethylethylsiloxy)-silylpropyl](meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl) propyloxy)-propyl](meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy) propyl](meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl](meth)acrylamide, N,N-bis [2-hydroxy-3-(3-(t-butyldimethylsilyl)propyloxy)propyl]-2-methyl (meth)acrylamide, N-2-(meth) acryloxyethyl-O-(methyl-bis-trimethylsiloxy-3-propyl)silylcarbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

48. The silicone hydrogel contact lens of any one of embodiments 45 to 47, wherein said at least one silicone-containing vinylic monomer comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth) acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimeth- ylsiloxane, α-[(meth)

acryloxy-2-hydroxypropyl-aminopropyl]-terminated ω-$C_1$-$C_4$-alkyl terminated polydimethylsiloxane, α-[(metyl)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy) dimethylbutylsilane) (meth)acrylamide, N-(2,3-dihydroxypropane)-N'-(propyltetra(dimethylsiloxy) dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

49. The silicone hydrogel contact lens of any one of embodiments 33 to 48, wherein the silicone hydrogel material comprises repeating units of at least one polysiloxane vinylic crosslinker.

50. The silicone hydrogel contact lens of embodiment 49, wherein said at least one polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N, N, N', N'-tetrakis(3-methacryloxy-2-hydroxypropyl)-alpha,omega-bis-3-aminopropyl-polydimethylsiloxane, or a combination thereof.

51. The silicone hydrogel contact lens of embodiment 49 or 50, wherein said at least one polysiloxane vinylic crosslinker comprises a vinylic crosslinker of formula (I)

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

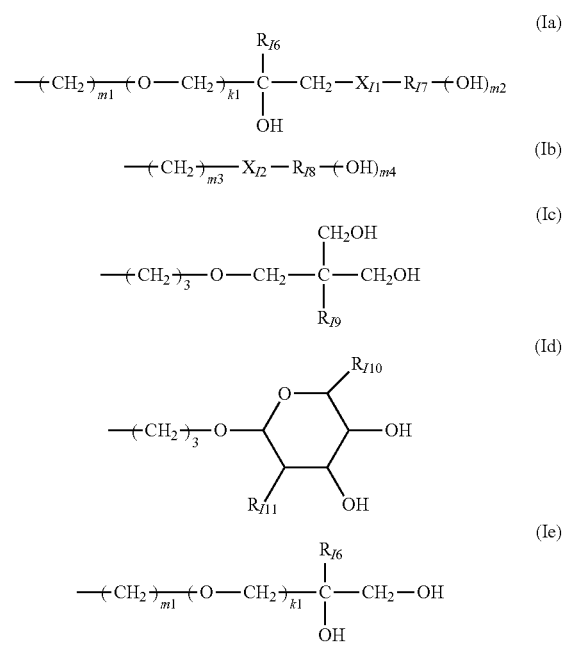

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydroxymethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and

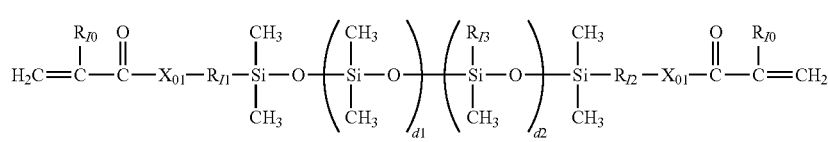

in which:
d1 is an integer of from 30 to 500 and d2 is an integer of from 1 to 75, provided that
d2/d1 is from about 0.035 to about 0.15 (preferably from about 0.040 to about 0.12, even more preferably from about 0.045 to about 0.10);
$X_{01}$ is O or $NR_{IV}$ in which $R_{IV}$ is hydrogen or $C_1$-$C_{10}$-alkyl;
$R_{I0}$ is hydrogen or methyl;

$X_{I2}$ is an amide linkage of

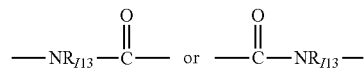

in which $R_{I13}$ is hydrogen or $C_1$-$C_{10}$ alkyl.

52. The silicone hydrogel contact lens of any one embodiments 49 to 51, wherein said at least one polysiloxane vinylic crosslinker comprises: (1) a vinylic crosslinker which comprises one sole polydiorganosiloxane segment and two terminal ethylenically-unsaturated groups selected from the group consisting of (meth) acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth) acryloylamino groups, vinyl carbonate groups, vinylcarbamate groups.

53. The silicone hydrogel contact lens of any one embodiments 49 to 52, wherein said at least one polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bisRmeth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

54. The silicone hydrogel contact lens of any one embodiments 33 to 53, wherein the silicone hydrogel material comprises repeating units of at least one hydrophilic vinylic monomer.

55. The silicone hydrogel contact lens of embodiment 54, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2- caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(triimethylammonio)ethyl phosphate, 6-((meth)acryloyloxy)hexyl-2-(trimethylammonio)-ethylphosphate, 2-((meth)acryloyloxy)ethyl-2'-(trimethylammonio)ethylphosphate, 2-((meth)acryloyloxy)ethyl-2'-(tripropylammonio)ethylphosphate, 2-((meth)acryloyloxy)ethyl-2'-(tributylammonio)ethylphosphate, 2-((meth)acryloyloxy)propyl-2'-(trimethylammonio)-ethylphosphate, 2-((meth)acryloyloxy)butyl-2'-(thmethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2''-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

56. The silicone hydrogel contact lens of embodiment 54 or 55, wherein said at least one hydrophilic vinylic monomer comprises N-vinylpyrrolidone, N-vinyl-N-methyl acetamide, or combinations thereof.

57. The silicone hydrogel contact lens of any one of embodiments 54 to 56, wherein said at least one hydrophilic vinylic monomer comprises N,N-dimethyl (meth)acrylamide.

58. The silicone hydrogel contact lens of any one of embodiments 54 to 57, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

59. The silicone hydrogel contact lens of any one of embodiments 33 to 58, wherein the silicone hydrogel material comprises repeating units of at least one non-silicone vinylic cross-linking agent.

60. The silicone hydrogel contact lens of embodiment 59, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N, N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

61. The silicone hydrogel contact lens of any one of embodiments 33 to 60, wherein the silicone hydrogel material comprises repeating units of at least one blending vinylic monomer.

62. The silicone hydrogel contact lens of embodiment 61, wherein said at least one blending vinylic monomer comprises Ci-Cio alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth) acrylate, hexafluoro-isopropyl (meth)acrylate, hexafluorobutyl (meth)acrylate, or combinations thereof.

63. The silicone hydrogel contact lens of embodiment 61 or 62, wherein said at least one blending vinylic monomer comprises methyl methacrylate.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows. Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Example 2

A polydiorganosiloxane vinylic crosslinker having pendant reactive functional groups (e.g., primary hydroxyl groups) is prepared according to the procedures shown in Scheme 1

Scheme 1

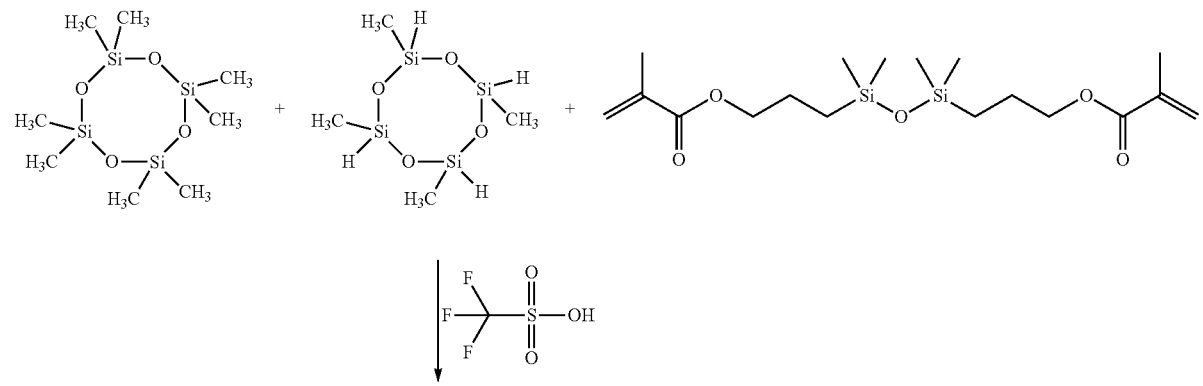

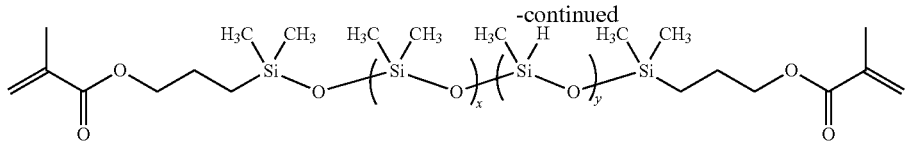

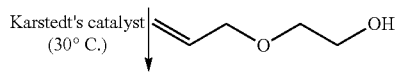

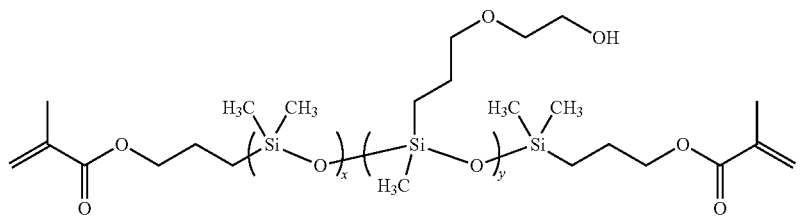

x = 93; y = 5

Synthesis of the Precursor 275.9 g of octamethylcyclotetrasiloxane (M.W. 296.62), 12.0 g of 1,3,5,7-tetramethylcyclotetrasiloxane (M.W. 240.51), 15.3 g of 1,3-bis(3-methacryloxypropyl) tetramethyldisiloxane (M.W. 386.63), and 0.9 g of trifluoromethanesulfonic acid (M.W. 150.08) are weighed into a 500 mL round bottom flask. After the reaction is run at 35° C. for 24 h, 170 mL of 0.5% sodium hydrogen carbonate is added. The collected organic portion is further extracted five times with de-ionized water (170 mL per cycle). Anhydrous MgSO₄ is added to the collected organic solution, followed by ~350 mL of additional CHCl₃, and the solution is then stirred overnight. After filtration, the solvent is removed via Rotovap, followed by high vacuum. 102 g of final product (the precursor) is obtained.

Hydrosilylation Reaction with Allyloxyethanol

A small reactor is connected to a heater and air condenser with drying tube. 21 g of toluene, 15 g of above precursor, and 3.88 g of allyloxyethanol are added to the reactor. After the solution temperature is stabilized at 30° C., 152 μL of Karstedt's catalyst (2 Pt % in xylene) is added. After 2 h, the conversion of Si—H of 100% based on IR is achieved. The solution is then transferred to a flask, concentrated using Rotovap, followed by precipitation in actenotrile/water mixture (75/25) three times. After removal of solvent via Rotovap, followed by high vacuum, 10 g of hazy liquid is obtained. The molecular weight is determined by $H^1$ NMR spectroscopy Example 3

A hydrophilized polydiorganosiloxane vinylic crosslinker is prepared according to the procedures shown in Scheme 2.

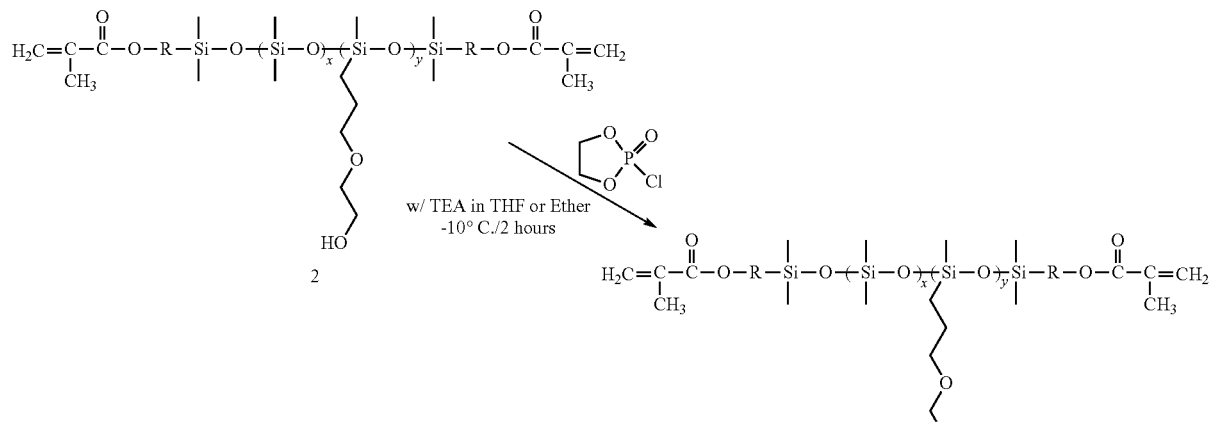

Scheme 2

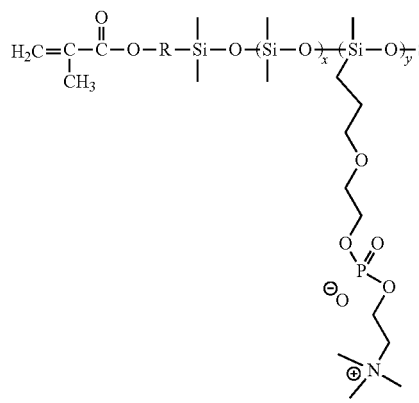

-continued

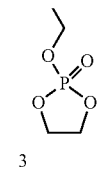

3

1 x = 75-80
y = 25-27
(x:y = 3:1)

R = —(CH$_2$)$_3$—

Synthesis of the hydrophilized polydiorganosiloxane vinylic crosslinker 1 is accomplished by reacting hydroxyl-group containing PDMS 2 with commercially available 2-Chloro-2-oxo-1,3,2-dioxaphospholane (COP) in THF (or a compatible solvent) at a low temperature (e.g., around −10° C.) to produce intermediate 3 which is in turn reacted with trimethylamine in THF (or a compatible solvent) at a slightly elevated temperature (e.g., 50° C.). Reaction conditions for the preparation of the hydrophilized polydiorganosiloxane vinylic crosslinker can follow procedures similar to what is described in literature for synthesis of 2-(methacryloyloxy)ethyl-2-(tri methylammonium)ethyl phosphate (MPC) (see, Takashi Umeda, Tadao Nakaya, Minoru Imoto, Makromol. *Chem., Rapid Commun.* 3, 457-459 (1982) and Kazuhiko Ishihara, Tomoko Ueda, Nobuko Nakabayashi, *Polymer Journal,* 22, 355-360 (1990)) and those procedures illustrated in Example 4 excluding those procedures involved in the reaction between ethylene cyclic phosphate-containing PDMS 3-A and dimethylaminopropyl methacrylamide.

The hydrophilized polydiorganosiloxane vinylic crosslinker can be then purified and characterized according to the experimental procedures described in Example 4.

Example 4

The reaction carried out in Example 4 are summarized in Scheme 3 below:

Scheme 3

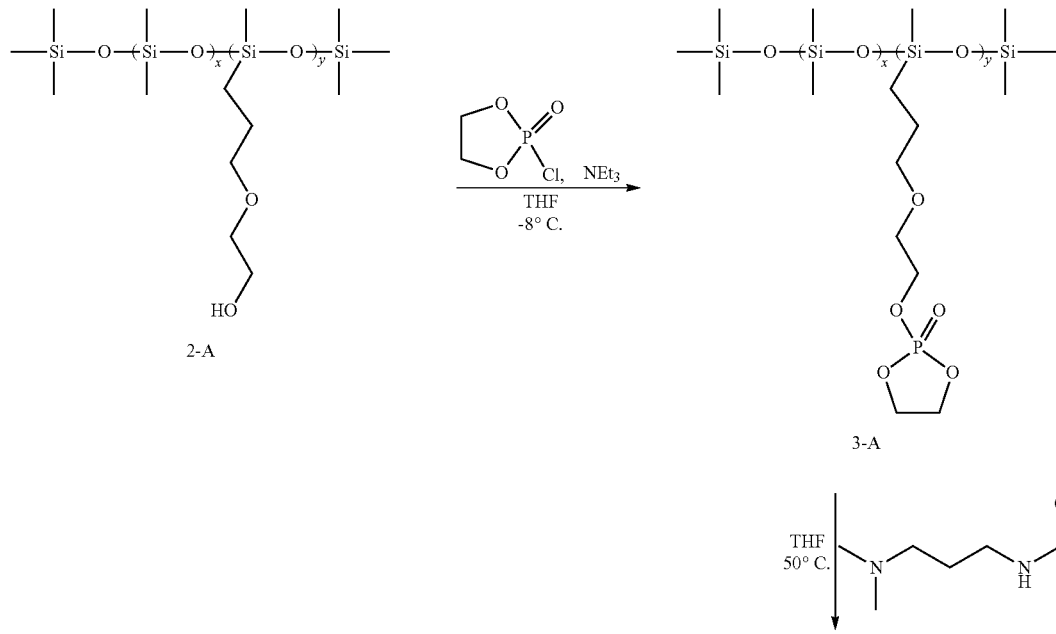

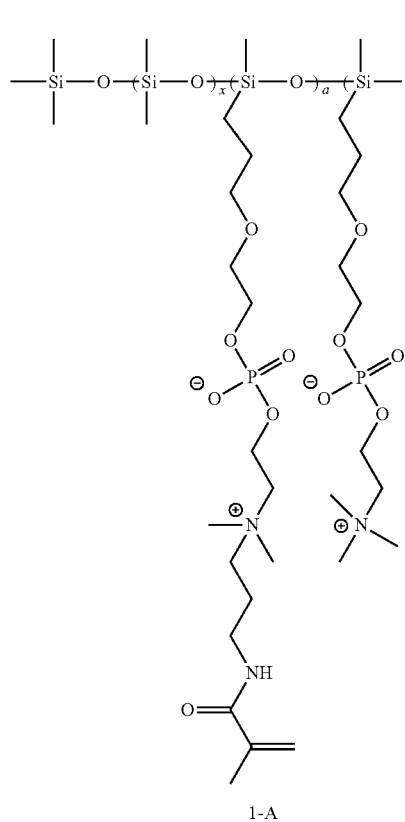

1-A

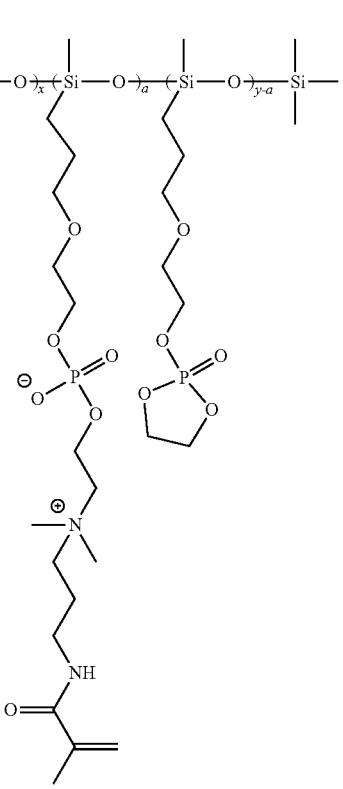

4-A

A 500 mL jacketed reactor equipped with a mechanical stirrer, thermocouple, nitrogen feed (fitted to condenser), septum and condenser is cooled down to −10° C. and purged with nitrogen for 60 min at the rate of 100 mL/min.

Hydroxyl-group containing PDMS 2-A (6.10 g, MW~10,000 g/mol, x=88, y=23) is charged into an Erlenmeyer flask equipped with magnetic stirrer and flask is capped with a rubber septum. Anhydrous THF (75 mL) is cannulated to the flask through the septum. The contents of the flask are allowed to stir at room temperature until all polymer dissolved, then it is cannulated into the reactor. Triethylamine (1.45 g, 14.33 mmol) is added to the reactor via syringe.

2-chloro-2-oxo-1,3,2-dioxaphospholane (COP) (2.03 g, 14.25 mmol) is dissolved in 30 mL of THF and charged into 500 mL Hamilton Gas Tight syringe equipped with 20 in. stainless steel needle. Syringe is secured to a Harvard PHD Infusion syringe pump and stainless-steel needle is inserted into the reactor via rubber septum.

Solution of the COP in THF is added via syringe pump over the course of 50 minutes, during this time the temperature of the reactor is maintained between −10° C. and −8° C. After addition of COP, the reaction mixture is additionally stirred for 2 h at around −8° C. to form a ethylene cyclic phosphate-containing PDMS 3-A. During this time significant amount of triethylammonium hydrochloride precipitates out. After 2 hours of stirring at −8° C., the temperature of the reaction is increased to 25° C. and dimethylaminopropyl methacrylamide (0.45 g, 2.64 mmol) in 20 mL of THF is added to the reactor. Temperature of the reaction is increased to 50° C. and it is allowed to stir for 18 hours. Then reaction mixture is cooled down to 0° C. and solution of trimethylamine in THF (1.0 M in THF, 20 mL, 20 mmol) is added via syringe. It is allowed to stir at 50° C. for 6 hours, then temperature of the reactor is lowered to 0° C. and an additional amount of trimethylamine solution in THF is added (10 mL). Temperature of the reaction is increased to 50° C. and it is allowed to stir for additional 23 hours.

Content of the reactor is transferred to the beaker. Triethylammonium hydrochloride which precipitated in first step is filtered off and is washed with THF. 1-propanol is added the filtrate and it is subjected to rotary evaporation. Evaporation and gradual addition of 1-propanol continued until all THF is evaporated. Modified polymer in 1-propanol is purified by dialysis in 1 kDa MWCO Regenerated Cellulose Membrane. Dialysis starts in 50:50 1-propanol/water solvent system and gradually is switched to pure DI water. After dialysis, 436 g of aqueous polymer solution is collected. The solution is filtered through Porosity 3 Schott funnel and concentrates on rotary evaporator until reaching 1.8% solids. Total of 250 g of 1.8% solution is obtained after evaporation.

Further concentration of 1.8% aqueous polymer solutions leads to precipitation of the polymer as a white rubbery agglomerates. Addition of 1-propanol/water dissolves it back but re-dissolution takes long time, hence it is recommended to stop concentration of the polymer when solution starts becoming slightly hazy.

Formation of the desired product is confirmed by $^{31}$P NMR (peak at −0.09 ppm) and $^1$H NMR (peaks at 5.637 and 5.390 ppm (methacrylamide) and 3.126 and 3.113 ppm (—N$^+$(CH$_3$)$_3$ and (—N$^+$(CH$_3$)$_2$—CH$_2$—).

All the publications, patents, and patent application publications, which have been cited herein above, are hereby incorporated by reference in their entireties.

What is claimed is:

1. A hydrophilized polydiorganosiloxane vinylic crosslinker, comprising:
   (1) a polydiorganosiloxane segment comprising dimethylsiloxane units and at least one hydrophilized siloxane unit having one methyl substituent and one organic substituent having one phosphorylcholine moiety; and
   (2) ethylenically-unsaturated groups.

2. The hydrophilized polydiorganosiloxane vinylic crosslinker of claim 1, wherein the polydiorganosiloxane segment comprises from 6 to 500 dimethylsiloxane units.

3. The hydrophilized polydiorganosiloxane vinylic crosslinker of claim 2, wherein the polydiorganosiloxane segment comprises from 3 to 80 hydrophilized siloxane units.

4. The hydrophilized polydiorganosiloxane vinylic crosslinker of claim 3, wherein the ethylenically unsaturated groups are (meth)acryloyl groups.

5. The hydrophilized polydiorganosiloxane vinylic crosslinker of claim 3, wherein the molar ratio of the hydrophilized siloxane units to the dimethylsiloxane units is from about 0.002 to about 0.50.

6. The hydrophilized polydiorganosiloxane vinylic crosslinker of claim 5, wherein the hydrophilized polydiorganosiloxane vinylic crosslinker has a number average molecular weight of at least 1000 Daltons.

7. The hydrophilized polydiorganosiloxane vinylic crosslinker of claim 3, wherein the hydrophilized polydiorganosiloxane vinylic crosslinker is defined by formula (1) or (2)

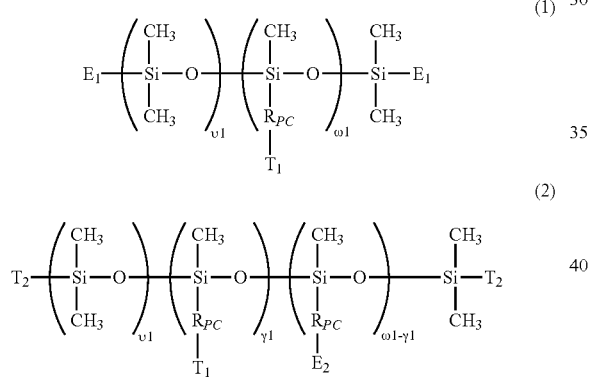

in which:
$\upsilon 1$ is an integer of from 6 to 500;
$\omega 1$ is an integer of from 3 to 80;
$\gamma 1$ is an integer of from 1 to 78;
$E_1$ is a monovalent radical of

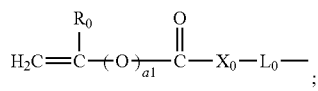

$E_2$ is a monovalent radical of

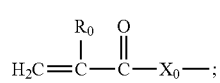

$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

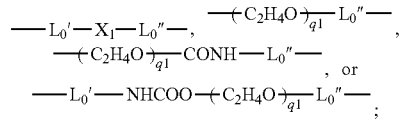

$L_0'$ is a $C_2$-$C_8$ alkylene divalent radical;
$L_0''$ is $C_3$-$C_8$ alkylene divalent radical;
$X_1$ is —O—, —$NR_{N1}$—, —NHCOO—, —OCONH—, —$CONR_{N1}$—, or —$NR_{N1}$CO—;
q1 is an integer of 1 to 20;
$R_{PC}$ is a monovalent radical of

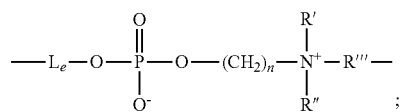

$L_e$ is a divalent radical of

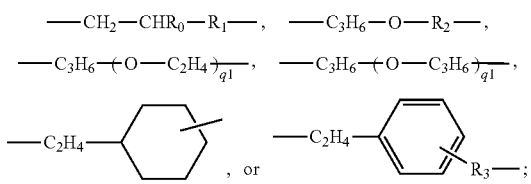

$R_1$ is a linear or branched $C_1$-$C_{10}$ alkylene divalent radical;
$R_2$ is a linear or branched $C_3$-$C_{10}$ alkylene divalent radical;
$R_3$ is a direct bond or a linear or branched $C_1$-$C_4$ alkylene divalent radical;
n is an integer of 1 to 5;
R' and R" independently of each other are $C_1$-$C_8$ alkyl or $C_1$-$C_8$ hydroxyalkyl;
R''' is a $C_1$-$C_8$ alkylene divalent radical;
$T_1$ is hydrogen, a hydroxyl group or a $C_1$-$C_4$ alkoxy; and
$T_2$ is a $C_1$-$C_8$ alkyl, a $C_1$-$C_8$ hydroxyalkyl, $R_4$—O—$R_5$—, or —$R_{PC}$—$T_1$;
$R_4$ is a $C_1$-$C_4$ alkyl; and
$R_5$ is a $C_2$-$C_8$ alkylene divalent radical.

8. The hydrophilized polydiorganosiloxane vinylic crosslinker of claim 7, wherein in formula (1) or (2) $\upsilon 1$ is an integer of from 10 to 450.

9. The hydrophilized polydiorganosiloxane vinylic crosslinker of claim 8, wherein in formula (1) or (2) $\omega 1$ is an integer of from 5 to 70.

10. The hydrophilized polydiorganosiloxane vinylic crosslinker of claim 8, wherein the hydrophilized polydiorganosiloxane vinylic crosslinker is represented by formula (1).

11. The hydrophilized polydiorganosiloxane vinylic crosslinker of claim 10, wherein in formula (1) a1 is zero.

12. The hydrophilized polydiorganosiloxane vinylic crosslinker of claim 11, wherein in formula (1) $X_0$ is O.

13. The hydrophilized polydiorganosiloxane vinylic crosslinker of claim 11, wherein in formula (1) $X_0$ is $NR_{N1}$.

14. The hydrophilized polydiorganosiloxane vinylic crosslinker of claim 8, wherein the hydrophilized polydiorganosiloxane vinylic crosslinker is represented by formula (2).

15. The hydrophilized polydiorganosiloxane vinylic crosslinker of claim 14, wherein in formula (2) $X_0$ is O.

16. The hydrophilized polydiorganosiloxane vinylic crosslinker of claim 15, wherein in formula (2) $X_0$ is $NR_{N1}$.

17. A silicone hydrogel contact lens, comprising a crosslinked polymeric material that comprises units of a hydrophilized polydiorganosiloxane vinylic crosslinker, wherein the hydrophilized polydiorganosiloxane vinylic crosslinker comprises:
   (1) a polydiorganosiloxane segment comprising from 6 to 500 dimethylsiloxane units and 3 to 80 hydrophilized siloxane units each having one methyl substituent and one organic substituent having one phosphorylcholine moiety; and
   (2) ethylenically-unsaturated groups.

18. The silicone hydrogel contact lens of claim 17, wherein the molar ratio of the hydrophilized siloxane units to the dimethylsiloxane units is from about 0.002 to about 0.50.

19. The silicone hydrogel contact lens of claim 17, wherein, wherein the hydrophilized polydiorganosiloxane vinylic crosslinker has a number average molecular weight of at least 1000 Daltons.

20. The silicone hydrogel contact lens of claim 17, wherein the hydrophilized polydiorganosiloxane vinylic crosslinker is defined by formula (1) or (2)

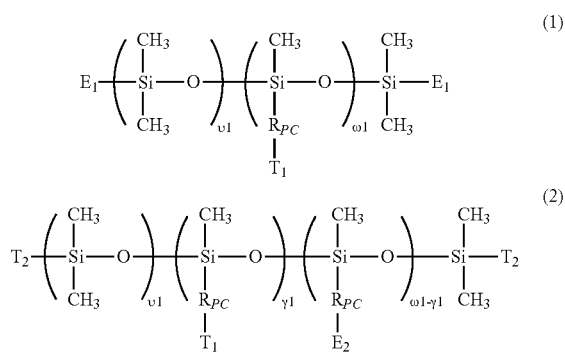

in which:
   υ1 is an integer of from 6 to 500;
   ω1 is an integer of from 3 to 80;
   γ1 is an integer of from 1 to 78;
   $E_1$ is a monovalent radical of

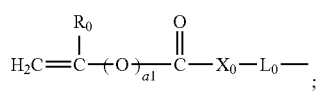

$E_2$ is a monovalent radical of

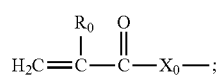

$R_0$ is hydrogen or methyl;
   a1 is zero or 1;
   $X_0$ is O or $NR_{N1}$;
   $R_{N1}$ is hydrogen or a $C_1$-$C_6$ alkyl;
   $L_0$ is a $C_2$-$C_8$ alkylene divalent radical or a divalent radical of

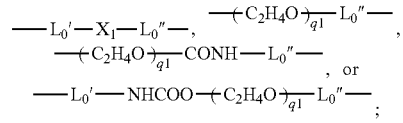

$L_0'$ is a $C_2$-$C_8$ alkylene divalent radical;
   $L_0''$ is $C_3$-$C_8$ alkylene divalent radical;
   $X_1$ is —O—, —$NR_{N1}$—, —NHCOO—, —OCONH—, —$CONR_{N1}$—, or —$NR_{N1}$CO—;
   q1 is an integer of 1 to 20;
   $R_{PC}$ is a monovalent radical of

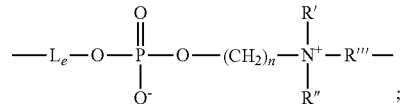

$L_e$ is a divalent radical of

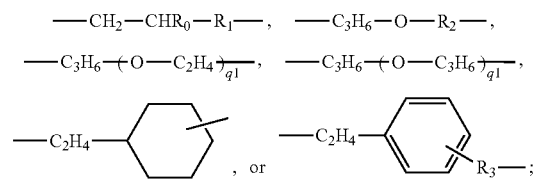

$R_1$ is a linear or branched $C_1$-$C_{10}$ alkylene divalent radical;
   $R_2$ is a linear or branched $C_3$-$C_{10}$ alkylene divalent radical;
   $R_3$ is a direct bond or a linear or branched $C_1$-$C_4$ alkylene divalent radical;
   n is an integer of 1 to 5;
   R' and R" independently of each other are $C_1$-$C_8$ alkyl or $C_1$-$C_8$ hydroxyalkyl;
   R'" is a $C_1$-$C_8$ alkylene divalent radical;
   $T_1$ is hydrogen, a hydroxyl group or a $C_1$-$C_4$ alkoxy; and
   $T_2$ is a $C_1$-$C_8$ alkyl, a $C_1$-$C_8$ hydroxyalkyl, $R_4$—O—$R_5$—, or —$R_{PC}$—$T_1$;
   $R_4$ is a $C_1$-$C_4$ alkyl; and
   $R_5$ is a $C_2$-$C_8$ alkylene divalent radical.

21. The silicone hydrogel contact lens of claim 20, wherein in formula (1) or (2) υ1 is an integer of from 10 to 450.

22. The silicone hydrogel contact lens of claim 21, wherein in formula (1) or (2) ω1 is an integer of from 5 to 70.

23. The silicone hydrogel contact lens of claim 17, wherein the silicone hydrogel contact lens, when being fully hydrated, has an oxygen permeability (Dk) of at least about 40 barrers, a water content of from about 15% to about 70% by weight, and an elastic modulus of from about 0.20 MPa to about 1.8 MPa.

* * * * *